(12) United States Patent
Le Fèvre et al.

(10) Patent No.: US 11,243,497 B2
(45) Date of Patent: Feb. 8, 2022

(54) TIMEPIECE BEARING

(71) Applicant: ROLEX SA, Geneva (CH)

(72) Inventors: Pierre Le Fèvre, Geneva (CH); Florent Millet, Septmoncel (FR)

(73) Assignee: ROLEX SA, Geneva (CH)

( * ) Notice: Subject to any disclaimer, the term of this patent is extended or adjusted under 35 U.S.C. 154(b) by 415 days.

(21) Appl. No.: 16/139,440

(22) Filed: Sep. 24, 2018

(65) Prior Publication Data

US 2019/0094808 A1    Mar. 28, 2019

(30) Foreign Application Priority Data

Sep. 25, 2017 (EP) .................................... 17192975
Sep. 25, 2017 (EP) .................................... 17192977

(51) Int. Cl.
*G04B 31/012* (2006.01)
*F16C 19/16* (2006.01)
(Continued)

(52) U.S. Cl.
CPC ........ *G04B 31/0123* (2013.01); *F16C 19/163* (2013.01); *F16C 19/166* (2013.01); *F16C 33/303* (2013.01); *F16C 33/3806* (2013.01); *F16C 33/41* (2013.01); *F16C 33/414* (2013.01); *F16C 33/42* (2013.01); *F16C 33/581* (2013.01); *F16C 33/664* (2013.01); *F16C 33/6688* (2013.01); *G04B 5/184* (2013.01); *G04B 5/19* (2013.01); *F16C 19/06* (2013.01); *F16C 19/10* (2013.01); *F16C 2206/48* (2013.01);
(Continued)

(58) Field of Classification Search
CPC ...... G04B 31/0123; G04B 5/184; G04B 5/19; G04B 5/04; G04B 5/18; G04B 31/08; F16C 19/163; F16C 19/166; F16C 33/303; F16C 33/3806; F16C 33/41; F16C 33/414; F16C 33/42; F16C 33/581
USPC ........................................................ 368/324
See application file for complete search history.

(56) References Cited

U.S. PATENT DOCUMENTS 3,980,359 A * 9/1976 Wetherbee, Jr. ........ F16C 19/06
 384/470
6,012,838 A * 1/2000 Hara ........................ G04B 5/16
 368/322

(Continued)

FOREIGN PATENT DOCUMENTS

CH 709 348 A1 9/2015
CH 711 020 A2 10/2016
(Continued)

OTHER PUBLICATIONS

Horotech:, "EN_28v", Tools 2016 (in English; cited in European Search Report A and European Search Report of priority appl. B; 22 pages).
(Continued)

*Primary Examiner* — Edwin A. Leon
(74) *Attorney, Agent, or Firm* — Westerman, Hattori, Daniels & Adrian, LLP

(57) ABSTRACT

A cage (5) for separating rolling bodies (2) for a bearing (1), particularly for a timepiece bearing, the cage having first openings (50) for receiving rolling bodies and at least one first contact zone (56) intended to come into contact with a bearing ring and having at least one first hollow formation (52).

22 Claims, 9 Drawing Sheets

(51) Int. Cl.
F16C 33/42 (2006.01)
G04B 5/19 (2006.01)
G04B 5/18 (2006.01)
F16C 33/41 (2006.01)
F16C 33/66 (2006.01)
F16C 33/58 (2006.01)
F16C 33/30 (2006.01)
F16C 33/38 (2006.01)
F16C 19/06 (2006.01)
F16C 19/10 (2006.01)

(52) U.S. Cl.
CPC ...... F16C 2206/60 (2013.01); F16C 2300/12 (2013.01); F16C 2370/00 (2013.01)

(56) References Cited

U.S. PATENT DOCUMENTS

2004/0105346 A1* 6/2004 Lang ................ G04F 7/0885
368/80
2006/0280393 A1 12/2006 Ebi
2010/0322039 A1* 12/2010 Kury ..................... G04B 1/16
368/142
2011/0221201 A1 9/2011 Nies

FOREIGN PATENT DOCUMENTS

| | | |
|---|---|---|
| DE | 1447 346 A1 | 2/1969 |
| EP | 1 520 111 B1 | 1/2006 |
| EP | 2 787 234 A1 | 10/2014 |
| FR | 1 219 331 A | 5/1960 |
| FR | 2 886 995 A1 | 12/2006 |
| JP | 2006-316933 A | 11/2006 |
| WO | 03/098063 A2 | 11/2003 |

OTHER PUBLICATIONS

European Search Report and Written Opinion dated Apr. 5, 2018 issued in counterpart application No. EP17192975; w/ English machine translation (21 pages; priority application A).

European Search Report and Written Opinion dated Apr. 5, 2018 issued in counterpart application No. EP17192977; w/ English machine translation (17 pages; priority application B).

* cited by examiner

TIMEPIECE BEARING

This application claims priority of European patent application No. EP17192975.5 filed Sep. 25, 2017, which is hereby incorporated by reference herein in its entirety, and this application claims priority of European patent application No. EP17192977.1 filed Sep. 25, 2017, which is hereby incorporated by reference herein in its entirety.

BACKGROUND

The invention relates to a cage for separating rolling bodies of a bearing or a cage for separating rolling bodies for a bearing. The invention also relates to a bearing, particularly a bearing comprising such a cage. The invention further relates to a timepiece mechanism comprising such a bearing or such a cage. The invention also relates to a timepiece movement comprising such a movement or such a bearing or such a cage. The invention further relates to a timepiece comprising such a movement or such a mechanism or such a bearing or such a cage. The invention also relates to a method for producing such a bearing or such a mechanism or such a movement or such a timepiece.

Bearings, in particular ball bearings, are currently used in the field of watchmaking, particularly for implementing the pivoting of movable elements such as oscillating weights of automatic winding movements. Indeed, the advantage of a bearing is that it allows rapid rotation of a movable element with minimum friction, while supporting significant axial and/or radial loads, whilst providing precise positioning of said movable element.

Patent application EP1520111 discloses a ball bearing with four contact points, the architecture of which is well known from the prior art. This bearing comprises a predetermined number of balls disposed in a cage, which is disposed between an outer ring and an inner ring formed by two washers that are fixed together. According to the teaching of this document, lubricating a timepiece bearing raises various problems with respect to, on the one hand, the difficulty of controlling the suitable quantity of lubricant and, on the other hand, possible drops in performance of said bearing. The document thus proposes implementing balls made of zirconium oxide ceramic, so as to propose a bearing that does not require lubrication.

Patent application CH709348 discloses a ball bearing architecture similar to that of the bearing of document EP1520111. The document describes a cage having a circular crown shape provided with cutaways in the vicinity of its outer periphery, which cutaways are provided to receive the balls. Like the single figure of the specification of patent EP1520111, document CH709348 describes a contact surface or a consequential potential contact surface between the cage and the inner ring of the bearing.

Patent application EP2787234 discloses a ball bearing architecture that slightly differs from that of the bearings of documents EP1520111 and CH709348, with a one-piece inner ring and an outer ring formed by two washers. In this case, the cage is in the form of a circular crown provided with cutaways in the vicinity of its inner periphery, which cutaways are provided to receive the balls. The document also describes a contact surface or a consequential potential contact surface between the cage and the outer ring of the bearing.

Patent application CH711020 relates to an alternative architecture of ball bearings. This implements one-piece inner and outer rings, between which a cage is disposed in the form of a hollow cylinder. This cage is provided with cutaways in the vicinity of one of the axial ends thereof, which cutaways are provided to receive the balls. During conventional operation of such a roller bearing, play remains between the cage and the rings, particularly the inner ring. However, an impact can cause contact between the cage and either of the two rings, particularly the inner ring. Like the preceding constructions, a consequential potential contact surface thus exists between the cage and the inner or outer ring of the bearing.

Furthermore, ball bearings exist that are devoid of a cage. By way of an example, the manufacturer MPS proposes a "full complement ball bearing" known commercially as "Myrox14". This bearing is formed by inner and outer rings made of zirconium oxide type ceramic and comprises balls also made of the same material.

SUMMARY

Various documents stipulate that timepiece bearings must not be lubricated due to the aforementioned disadvantages.

However, studies by the applicant show that the operating noise of an unlubricated bearing does not meet their performance criteria. Indeed, the operation of a bearing can cause a noise that can be heard by a horologist or even by a wearer of a wrist watch incorporating such a bearing, particularly when new or after several years of operation.

The aim of the invention is to provide a cage for separating rolling bodies of a bearing or a bearing allowing the aforementioned disadvantages to be overcome and the known devices of the prior art to be improved. In particular, the invention proposes a bearing, which may or may not be provided with a separation cage, that is quiet and for which performance over time remains stable.

According to a first aspect of the invention, a cage for a bearing is determined by the following definitions.

1. A cage for separating rolling bodies for a bearing, particularly for a timepiece bearing, the cage having first openings for receiving rolling bodies and at least one first contact zone intended to come into contact with a bearing ring and having at least one first hollow formation.

2. The cage according to definition 1, wherein the cage has a substantially flat annular shape or wherein the cage has a substantially cylindrical shape.

3. The cage according to one of definitions 1 and 2, wherein the cage comprises a first edge and a second edge, the first openings being openings emerging on the first edge or on the second edge and/or the at least one first hollow formation comprises at least one second opening passing through a thickness of the cage.

4. The cage according to definition 3, wherein the cage has a substantially flat annular shape, the first edge being an outer edge and the second edge being an inner edge, or wherein the cage has a substantially cylindrical shape, the first edge being an edge of a first end and the second edge being an edge of a second end.

5. The cage according to one of definitions 1 to 4, wherein it comprises a plurality of hollow formations, particularly a plurality of second openings, each disposed between two first adjacent openings.

6. The cage according to one of definitions 1 to 5, wherein the contact zone comprises at least one first projecting formation, a top of which is intended to participate in a cage-bearing ring interface.

7. The cage according to definition 6, wherein the at least one first projecting formation comprises a rib of circular or substantially circular shape and/or wherein the at least one first projecting formation comprises a set of bosses, particularly at least three bosses, in particular at least three bosses disposed circularly or substantially circularly and/or at least three bosses disposed at a regular or substantially regular angular interval relative to an axis of the cage.

8. The cage according to one of definitions 1 to 7, wherein the cage is arranged so that the area of a surface of the cage capable of coming into contact with a bearing ring is less than 0.6 or 0.5 or 0.45 or 0.4 or 0.3 times the area of:
the orthogonal projection of the cage along an axis of the cage, particularly an axis of rotational symmetry of the cage, when the cage is a flat annular cage; or
the cylindrical surface of a cylinder having a diameter equal to that of the diameter of the cylinder defining the surface of the cage and included between two end edges of the cage when the cage is a cylindrical cage.

According to the first aspect of the invention, a bearing is determined by the following definitions.

9. A bearing, particularly a timepiece bearing, comprising a first ring, particularly an inner ring, a second ring, particularly an outer ring, rolling bodies and a cage for separating rolling bodies, particularly a separation cage according to one of definitions 1 to 8, the cage and the first and second rings being arranged so that the area of a surface of the cage capable of coming into contact with the rings is less than 0.6 or 0.5 or 0.45 or 0.4 or 0.3 times the area of:
the orthogonal projection of the cage along an axis of the bearing when the cage is a flat annular cage; or
the cylindrical surface of a cylinder having a diameter equal to that of the diameter of the cylinder defining the surface of the cage and included between two end edges of the cage when the cage is a cylindrical cage.

10. The bearing according to definition 9, wherein a surface of one of the first and second rings comprises at least one second contact zone having at least one second hollow formation and/or at least one second projecting formation, the top of which participates in a cage-ring interface.

11. The bearing according to definition 10, wherein the at least one second projecting formation comprises a circular or substantially circular shaped rib and/or wherein the at least one second projecting formation comprises a set of bosses, particularly at least three bosses, in particular at least three bosses disposed circularly or substantially circularly and/or at least three bosses disposed at a regular or substantially regular angular interval relative to an axis of the bearing.

12. The bearing according to one of definitions 9 to 11, wherein it comprises at least one surface of the first ring and/or of the second ring and/or of a rolling body coated with a lubricant, particularly a lubricant with kinematic viscosity at a temperature of 20° C. that is between 8 and 15 St, in particular equal to 10 St or approximately equal to 10 St and/or wherein the first ring comprises a first annular element and a second annular element, the first and second annular elements being shaped so as to provide, when they are assembled, a groove for accommodating the cage and/or wherein the rolling bodies are balls or needles or rollers, particularly cylindrical or tapered rollers and/or wherein the rolling bodies are made of ceramic, particularly made of zirconium oxide or silicon nitride.

According to the first aspect of the invention, a mechanism is determined by the following definition.

13. A timepiece mechanism, particularly an oscillating weight device or an automatic winding device, comprising a bearing according to one of definitions 9 to 12 or a cage according to one of definitions 1 to 8.

According to the first aspect of the invention, a movement is determined by the following definition.

14. A timepiece movement comprising a cage according to one of definitions 1 to 8 or a bearing according to one of definitions 9 to 12 or a mechanism according to definition 13.

According to the first aspect of the invention, a timepiece is determined by the following definition.

15. A timepiece, particularly a wrist watch, comprising a movement according to definition 14 or a cage according to one of definitions 1 to 8 or a bearing according to one of definitions 9 to 12 or a mechanism according to definition 13.

According to the first aspect of the invention, a method is determined by the following definitions.

16. A method for producing a timepiece bearing or a timepiece mechanism or a timepiece movement or a timepiece, the method comprising the following steps:
providing a bearing according to one of definitions 9 to 12;
applying, on at least one surface of the first ring and/or of the second ring and/or of a rolling body, a lubricant, particularly a lubricant with kinematic viscosity at a temperature of 20° C. that is between 8 and 15 St, in particular equal to 10 St or substantially equal to 10 St.

17. The method according to definition 16, wherein the lubricant is applied by jetting or by contactless spraying.

According to a second aspect of the invention, a bearing is determined by the following definitions.

18. A timepiece bearing, comprising a first ring, particularly an inner ring, a second ring, particularly an outer ring, and rolling bodies, the bearing comprising at least one surface of the first ring and/or of the second ring and/or of a rolling body coated with a lubricant.

19. The bearing according to definition 18, wherein the kinematic viscosity of the lubricant at a temperature of 20° C. is between 8 and 15 St, in particular equal to 10 St or approximately equal to 10 St.

20. The bearing according to definition 18 or 19, wherein the bearing does not comprise a cage for separating rolling bodies or wherein the bearing is of the type with integral rolling bodies, particularly of the full complement ball bearing type, or wherein the rolling bodies are capable of coming into contact with each other.

21. The bearing according to one of definitions 18 to 20, wherein the first ring comprises a first annular element and a second annular element, the first and second annular elements being shaped so as to provide, when they are assembled, a groove for accommodating the cage.

22. The bearing according to one of definitions 18 to 21, wherein the rolling bodies are balls or needles or rollers, particularly cylindrical or tapered rollers.

23. The bearing according to one of definitions 18 to 22, wherein the rolling bodies are made of:
ceramic, particularly made of zirconium oxide or silicon nitride, or
steel, notably a bearing steel, such as a low-alloy steel containing Cr, for example 100Cr6 (DIN 1.3505) or 100CrMo7-3 (DIN 1.3536), or
superelastic alloy such as Nitinol.

24. The bearing according to one of definitions 18 to 23, wherein the first ring is made of steel or a stainless steel, for example a 4C27A (DIN 1.4197), or a superelastic alloy such as Nitinol and/or wherein the second ring is made of steel or a stainless steel, for example a 4C27A, or a superelastic alloy such as Nitinol.

25. The bearing according to one of definitions 18 to 24, wherein the bearing comprises between 25 and 35 rolling bodies or balls, particularly 27 or 28 or 29 or 30 rolling bodies or balls.

26. The bearing according to one of definitions 18 to 25, wherein the balls or rolling bodies are mounted in the rings with a tangential play or clearance, the play being for example higher than the radius of the balls or rolling bodies or equal to the radius of the balls or rolling bodies and/or the play being for example lower than the diameter of the balls or rolling bodies or equal to the diameter of the balls or rolling bodies.

According to the second aspect of the invention, a mechanism is determined by the following definitions.

27. A timepiece mechanism, particularly an oscillating weight device or an automatic winding device, comprising a bearing according to one of definitions 18 to 26.

28. The timepiece mechanism according to definition 27, wherein it comprises an oscillating weight, the static torque of which is greater than or equal to 120 µNm or 180 µNm or 220 µNm or 250 µNm and/or the oscillating weight weighing more than 2 g or 3 g or 4 g.

According to the second aspect of the invention, a movement is determined by the following definition.

29. A timepiece movement comprising a bearing according to one of definitions 18 to 26 or a mechanism according to definition 27 or 28.

According to the second aspect of the invention, a timepiece is determined by the following definition.

30. A timepiece, particularly a wrist watch, comprising a movement according to definition 29 or a bearing according to one of definitions 18 to 26 or a mechanism according to definition 27 or 28.

According to the second aspect of the invention, a method is determined by the following definitions.

31. A method for producing a timepiece bearing or a timepiece mechanism or a timepiece movement or a timepiece, the method comprising the following steps:
  providing a bearing comprising a first ring, particularly an inner ring, a second ring, particularly an outer ring and rolling bodies;
  applying a lubricant, on at least one surface of the first ring and/or of the second ring and/or of a rolling body.

32. The method according to definition 31, wherein the kinematic viscosity of the lubricant at a temperature of 20° C. is between 8 and 15 St, in particular equal to 10 St or substantially equal to 10 St.

33. The method according to definition 31 or 32, wherein the lubricant is applied by jetting or by contactless spraying.

Unless logically or technically incompatible, any combination of the features of the first and second aspects can be made.

BRIEF DESCRIPTION OF THE DRAWINGS

The accompanying figures represent, by way of an example, two embodiments of a timepiece according to the invention.

DETAILED DESCRIPTION

Figure 1:
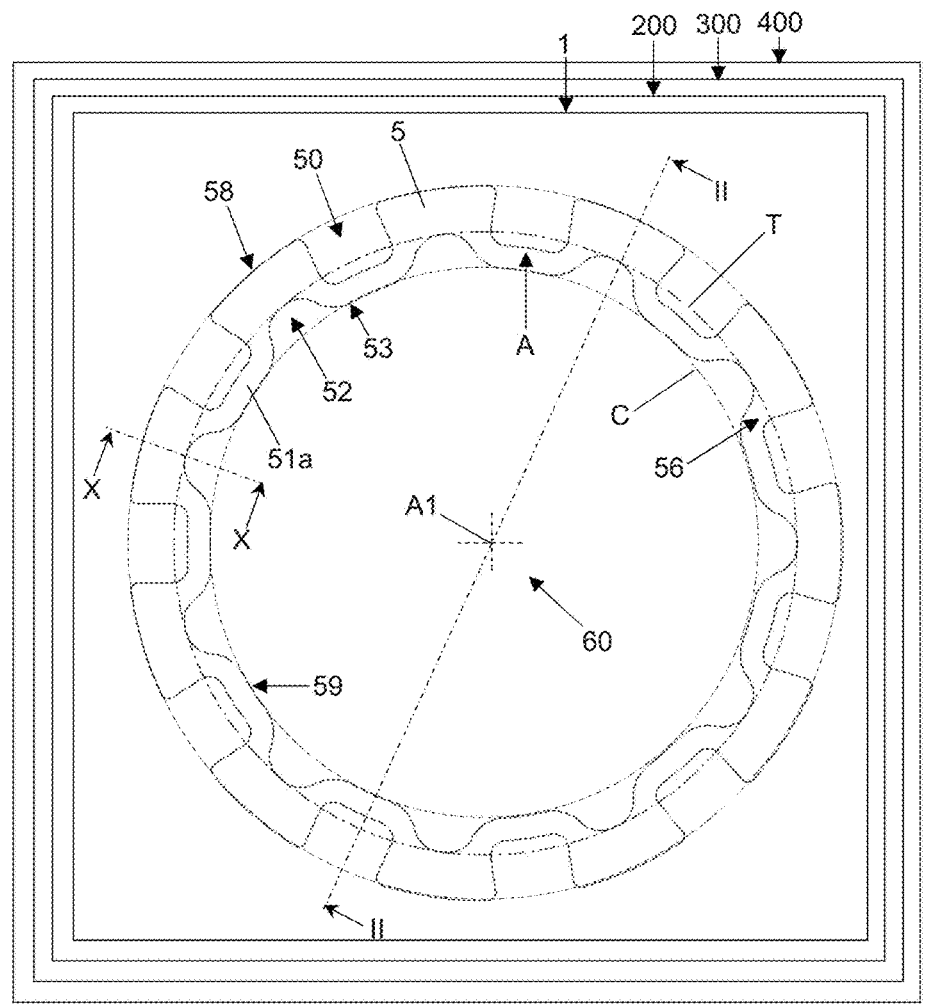
FIGS. 1 to 3 are views showing a first variation of a first embodiment of a timepiece.
Figure 2:
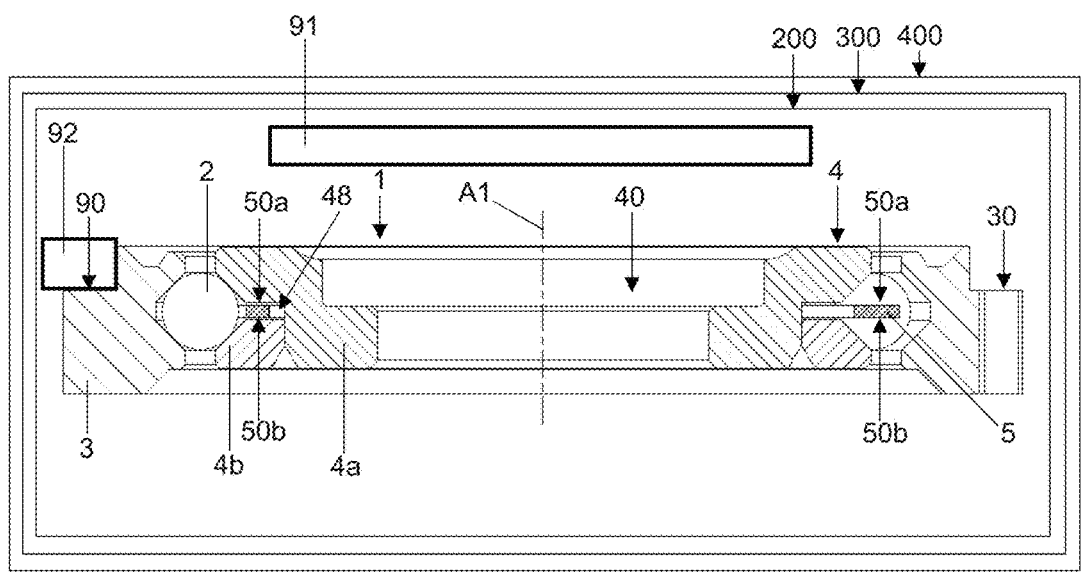
Figure 3:
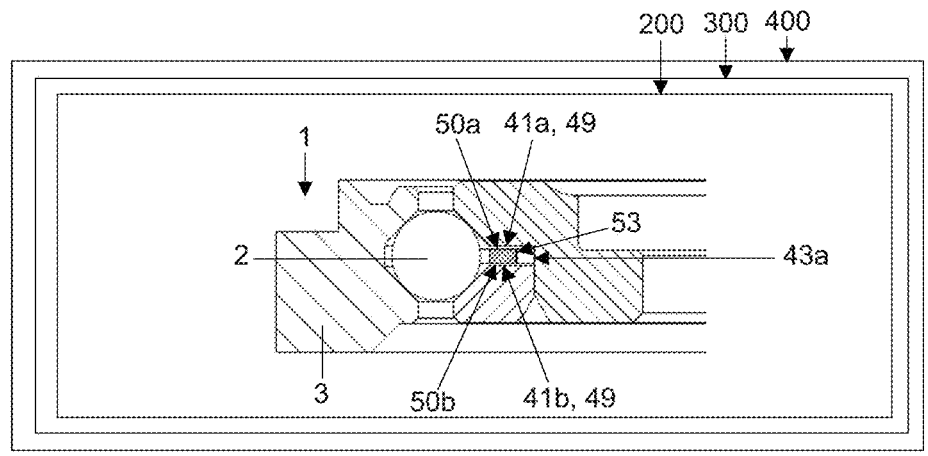

A first variation of a first embodiment of a timepiece 400 is described hereafter with reference to FIGS. 1 to 3. The timepiece is a watch, for example, in particular a wrist watch, particularly an automatic wrist watch.

The timepiece comprises a timepiece movement 300, in particular a mechanical movement, particularly an automatic movement.

The movement comprises a timepiece mechanism 200. This mechanism can be, for example, an oscillating weight device of an automatic winding device or can be an automatic winding device. The mechanism comprises a bearing. The bearing can be used for guiding an oscillating weight on a frame 91 around an axis A1.

The bearing 1 is, for example, a timepiece bearing, particularly a timepiece ball bearing. The bearing comprises a first ring 4, particularly an inner ring, a second ring 3, particularly an outer ring, rolling bodies 2, particularly balls, and a cage 5 for separating rolling bodies.

One of the rings 4 can be provided in order to be fixed to a frame of the timepiece movement. It thus can have a formation 40 allowing it to be assembled to the frame. Preferably, the other ring 3 has at least one means 30 for connecting to a mechanism of the movement. Said means can be a tooth 30, for example. The mechanism of the movement can be an automatic winding mechanism, for example. To this end, the ring 3 can further comprise a surface 90 for receiving an oscillating weight 92.

The bearing has an axis A1, about which the first or second ring is rotationally guided by means of the rolling bodies. The first and second rings each have a bearing track provided for bearing the rolling bodies.

The bearing comprises a predetermined number of rolling bodies 2 disposed in a separation cage 5. The separation cage is disposed between the outer ring 3 and the inner ring 4.

One of the first and second rings, for example, the inner ring, is formed by two annular elements or washers 4a, 4b that are fixed together or are simply elastically drawn toward each other, for example. The first and second annular elements are shaped so as to provide a groove 48 for accommodating the cage, when they are assembled or drawn toward each other to a position defined by the geometry of the rolling bodies or by a spacer provided between the first and second annular elements.

The cage 5 for separating rolling bodies 2 has first openings 50 for receiving the rolling bodies and at least one first contact zone 56 intended to come into contact with a bearing ring and having at least one first hollow formation 52. The ring does not form part of the cage.

The first contact zone preferably is an annular zone intended to come into contact with one of the first and second rings of the bearing, in particular with a second contact zone 49 of one of the first and second rings of the bearing.

The cage preferably comprises at least two first contact zones 56 intended to come into contact with two second contact zones on one and/or the other of the rings of the bearing. The at least one first hollow formation 52 allows any contact between the first and second contact zones to be limited.

The purpose of the cage is to separate the rolling bodies, so as to prevent direct contact between two consecutive rolling bodies. In other words, the cage 5 is a cage for retaining the rolling bodies in the direction in which it allows a separation to be maintained between two consecutive rolling bodies, particularly when the first and second rings are moving relative to each other, or it allows the rolling bodies to be kept in position relative to each other, particularly when the first and second rings are moving relative to each other.

In the first variation of the first embodiment, the cage is in the form of a flat or generally flat circular crown.

The cage comprises a first edge 58 and a second edge 59. The first edge 58 advantageously is circular. The first edge 58 preferably is centered or is substantially centered on the axis A1. The second edge 59 advantageously is circular. The second edge 59 preferably is centered or substantially centered on the axis A1 and/or preferably is concentric or substantially concentric to the first edge. The axis A1 preferably is an axis of rotational or substantially rotational symmetry of the cage.

The first openings 50 are openings emerging on the first edge 58 or on the second edge 59. In the first variation of the first embodiment, the first openings emerge on the first edge, which is the outer edge of the cage.

Figure 10:
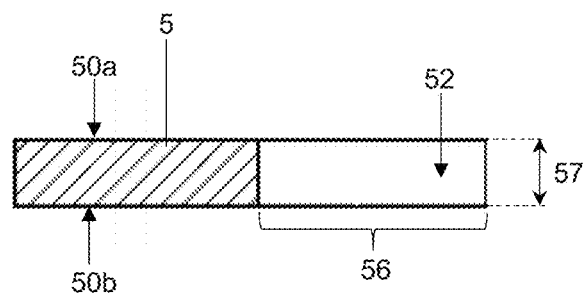
FIGS. 10 to 12 are section views of variations of a cage, in an X-X plane shown in FIG. 1.

The at least one first hollow formation 52 is, in this variation that is shown, at least one second opening 52 passing through a thickness 57 of the cage, as shown in FIG. 10.

Furthermore, the second opening 52 emerges on the second edge or on the first edge. In the first variation of the first embodiment, the second opening emerges on the second edge, which is the inner edge of the cage. However, the central opening 60 forming the crown, in particular the central, circular or substantially circular opening, and centered on the axis A1, does not form the second opening. The second opening is produced in the crown limited by the first edge and by the second edge.

Preferably, the cage can comprise a plurality of second openings 52. More preferably, the second openings 52 each can be disposed between two first adjacent openings.

Alternatively, the first openings and/or the one or more second opening(s) may not emerge on one and/or the other of the first and second edges.

In practice, the fact that the first and/or second opening(s) emerge on one and/or the other of the first and second edges can at least locally alter the circular nature of the first and/or of the second edge. Taken to the extreme, the first circular edge and/or the second circular edge can be defined as a portion of a cylinder circumscribed in relation to the cage and/or the first circular edge and/or the second circular edge can be defined as a cylinder portion inscribed in the central opening of the cage. A cylinder portion circumscribed in relation to the cage thus can form a portion of the outer periphery of the cage, that is a portion of the first or of the second edge. A cylinder portion inscribed in the central opening of the cage thus can form a portion of the inner periphery of the cage, that is a portion of the first or of the second edge.

The cage is also defined axially, in this first variation of the first embodiment, by flat surfaces 50a, 50b. The surfaces 50a, 50b can be delimited in the plane by portions of the inner periphery and by portions of the outer periphery of the cage. The distance between these flat surfaces defines a thickness 57 of the cage. The area of the flat surfaces 50a and/or 50b thus can be defined as being the area of the surface B of the cage. More generally, in all the embodiments and variations in which the cage has a generally flat annular shape, the area of the surface B of the cage can be defined as being the area of the projection of the cage along the axis A1 on a plane perpendicular to the axis A1. Thus, any extrusion or protrusion, but also any groove or slot, disposed on the surface of the cage does not affect the area of the surface B of the cage. In other words, the surface B is the orthogonal projection of the cage along the axis A1.

The movements of the cage relative to one and/or the other of the first and second rings are limited:
  axially relative to the axis A1, on the one hand, by the surfaces 41a and 41b of one and/or the other of the first and second rings, particularly the groove sidewall surfaces; and
  radially relative to the axis A1, on the other hand, by:
    a wall 43a of one and/or the other of the first and second rings, particularly a groove bottom wall; and/or
    the rolling bodies in the event that enough radial clearance is left between the wall 53 of the cage and the wall 43a of the groove bottom of either of the first and second rings. In this case, the cage-ring contact areas advantageously can be further reduced.

The surfaces 41a and 41b can be, for example, respectively disposed on the annular elements 4a and 4b of the second ring, particularly the inner ring. The surfaces 41a and 41b cooperate with the contact zones 49.

A radial clearance exists between the inner edge 59 of the cage and the groove bottom wall 43a. An axial clearance also exists between the surfaces 41a and 41b and the surfaces 50a and 50b. The ring-cage interfaces define the axial clearance of the cage relative to the rings.

The first contact zone 56 or the potential contact surface between the cage 5 and one of the rings, particularly the annular element 4a or the annular element 4b, is delimited by the broken line circle T and the circle C inscribed in the central opening, which are shown in FIG. 1.

Figure 13:
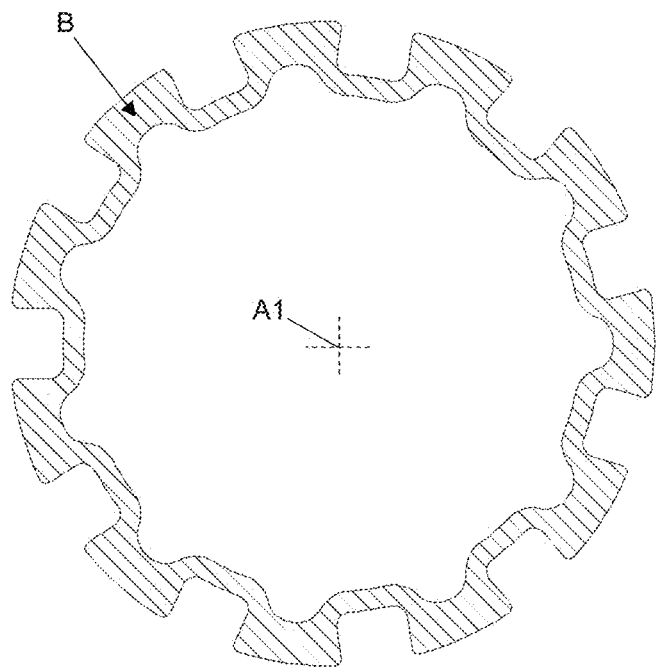
FIG. 13 is a view of the surface B of the cage of the first variation of the first embodiment.
Figure 14:
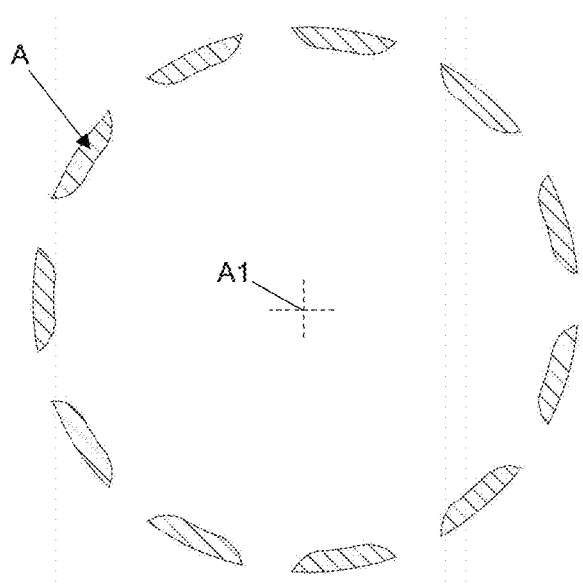
FIG. 14 is a view of the surface A of the cage of the first variation of the first embodiment.

The cage is arranged, or the cage and the first and second rings are arranged, so that the area of the surface A (which is shaded in FIG. 14) of the cage capable of coming into contact with the rings is less than 60%, even less than 50%, even less than 45%, even less than 30%, of the area of the surface B (which is shaded in FIG. 13) of the cage. The surface A is formed by all the points of a face of the cage capable of coming into contact with a ring of the bearing, in a normal operating mode of the bearing, i.e. when the bearing is assembled and one ring of the bearing is moving relative to another ring of the bearing about the axis A1. The surfaces A and B can be located on a first face of the cage and/or the surfaces A and B can be located on a second face of the cage.

The second openings or second cutaways 52 are shaped so as to minimize the area of the surface A. More specifically, these second cutaways 52 define a portion 56 formed by a plurality of projections 51a oriented toward the inside of the cage. Preferably, these second cutaways 52 are disposed between two first consecutive cutaways 50. Preferably, two projections 51a are disposed either side of a second cutaway 52. Preferably, the number of second cutaways 52 is equal to the number of cutaways 50.

In this first variation of the first embodiment, the area of the surface A corresponding to the sum of the areas A has a plurality of projections 51a.

In this first variation of the first embodiment, the cage 5 comprises eleven first cutaways 50 and eleven second cutaways 52. In this particular variation:

$$AA=0.4\times AB,$$

with:

AA: being the area of the surface A; and
AB: being the area of the surface B.

Advantageously, the projections 51a, in particular the ends of the projections 51a, are capable of breaking a film of lubricant disposed at the interface of the surfaces 50a and 41a or 50b and 41b. Advantageously, the projections 51a, in particular the ends of the projections 51a, are capable of breaking a film of oil disposed at the interface of the longitudinal groove bottom wall 43a and the longitudinal wall 53 of the inner edge of the cage. Advantageously, the lubricant can be contained within second cutaways 52 so that it does not induce resistive torque greater than a predefined torque. Thus, the lubricant does not adversely affect the performance of the bearing.

FIGS. 2 and 3 show the first variation of the first embodiment, in which the cage is axially delimited by flat surfaces 41a, 41b respectively disposed on the washers 4a, 4b of the inner ring 4. Of course, a bearing with an alternative architecture can be proposed, similar to that disclosed in document EP2787234, with a cage axially delimited by flat surfaces of the outer ring 3. In this example, not shown, the cage can be in the form of a flat circular crown provided with first cutaways 50 on its inner edge, which cutaways are provided to receive the rolling bodies. The second cutaways 52 then define a portion 51 comprising a plurality of projections 51a oriented toward the outside of the cage.

Figure 4:
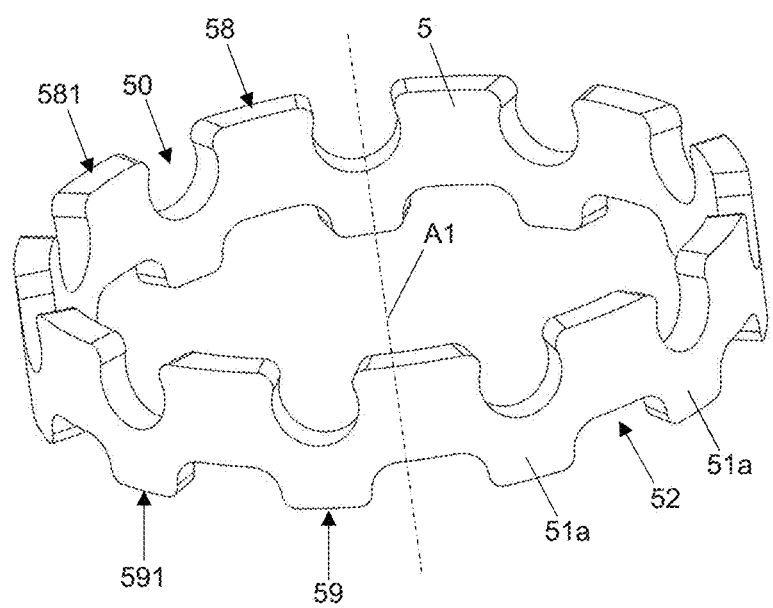
FIG. 4 is a view showing a cage of a second variation of the first embodiment of the timepiece.

In a second variation of the first embodiment shown in FIG. 4, the cage 5 differs from the cage of the first variation of the first embodiment in that it is of cylindrical shape. The axis of the cylindrical shape coincides or substantially coincides with the axis A1.

The first edge 58 is an edge of a first axial end 581 and the second edge 59 is an edge of a second axial end 591.

Therefore, the cage also can be in the form of a cutaway cylinder. First cutaways 50 are provided at the first axial end 581 of the cage, so as to receive rolling bodies 2, whereas second hollow formations 52 are provided at the second axial end of the cage, so as to minimize the potential cylindrical contact surface between the cage and one and/or the other of the two rings of the bearing, in particular the inner ring.

In this second variation, the cage is also axially defined by remote planes defining the first and second ends. The distance between these planes defines the length of the cage. The cage is also radially defined by a first cylinder and by a second cylinder coaxial to the first cylinder, with the difference in radius of the first and second cylinders defining a thickness of the cage. These first and second cylinders therefore determine the inner and outer diameters of the cage.

Figure 19:
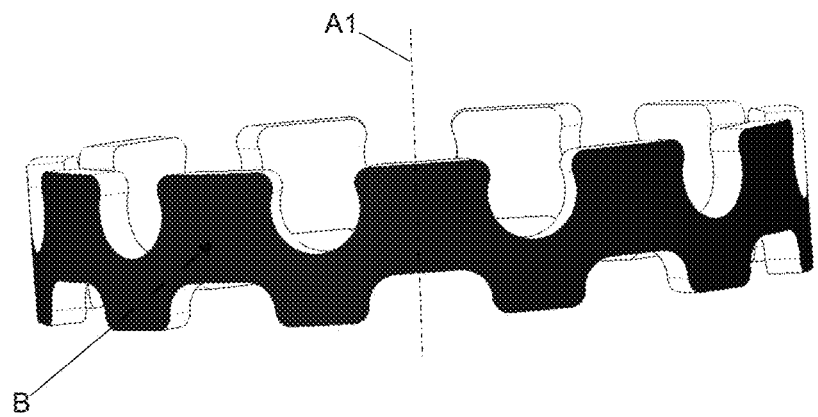
FIG. 19 is a view of the surface B of the cage of the second variation of the first embodiment.
Figure 20:
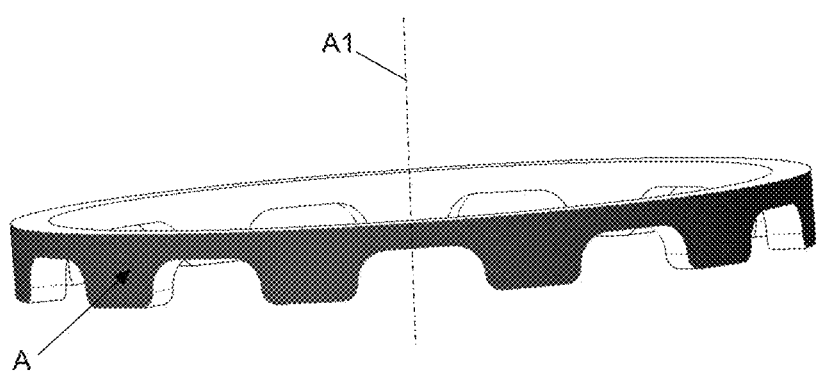
FIG. 20 is a view of the surface A of the cage of the second variation of the first embodiment.

The cage is arranged, or the cage and the first and second rings are arranged, so that the area of the surface A (shown in black in FIG. 20) on each side of the cage capable of coming into contact with either of the rings is less than 50%, even less than 45%, even less than 40%, even less than 30%, of the area of the cylindrical surface B (shown in black in FIG. 19) with a diameter equal to that of the diameter of the cylinder defining the surface A of the cage and included between two end edges of the cage. In this embodiment, a surface B therefore is the surface of the cage that is visible when viewing each point of the cage radial to the axis A1. In this embodiment, a surface A therefore is the surface of the cage that is capable of coming into contact with either of the rings and which is visible when viewing each point of the cage radial to the axis A1. The surfaces A and B can be located inside the cage, i.e. on the inner peripheral diameter of the cage, and/or the surfaces A and B can be located outside the cage, i.e. on the outer peripheral diameter of the cage.

In a third variation of the first embodiment, the cage 5 differs from the cage of the first variation of the first embodiment in that a surface of the ring further comprises at least one first axial projecting formation (i.e., along the axis A1). The top of this projecting formation is intended to participate in a cage-bearing ring interface.

The at least one first projecting formation comprises a rib. This rib can be of circular or substantially circular shape. Preferably, the at least one first projecting formation comprises two ribs. A first rib is provided to come into contact against a surface of a ring and a second rib is provided to come into contact against another surface of another ring or of the same ring. Advantageously, the first rib is provided on a first face of the cage, particularly on a first surface in the plane of the cage, and the second rib is provided on a second face of the cage, particularly on a second surface in the plane of the cage. One or more hollows (or undercuts) can be produced on one side or on each side of the rib.

Alternatively, the at least one first axial projecting formation (i.e. along the axis A1) comprises a set of bosses, particularly at least three bosses, in particular at least three bosses disposed circularly or substantially circularly relative to the axis A1 and/or at least three bosses disposed at a regular or substantially regular angular interval relative to the axis A1. Preferably, a first set of bosses is provided to come into contact against a first ring surface, particularly a first face of a first annular element and a second set of bosses is provided to come into contact against a second ring surface, particularly a second surface of a second annular element.

Still alternatively, the geometry of the cage also can be non-planar, particularly at one or more zones intended to come into contact with one of the rings. The cage can be in the shape of a crown with corrugated surface(s), particularly at one or more stipulated zone(s). Thus, projections can be oriented in the axial direction of the bearing, whereas the first cutaways 50 can be oriented toward the inside or the outside of the cage.

Figure 11:
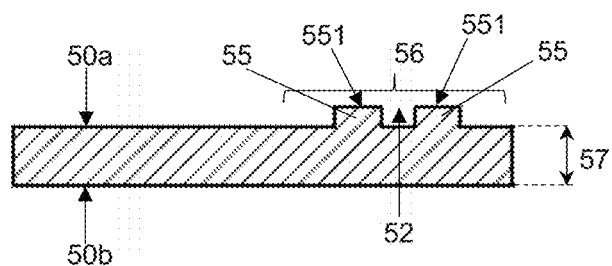
Figure 12:
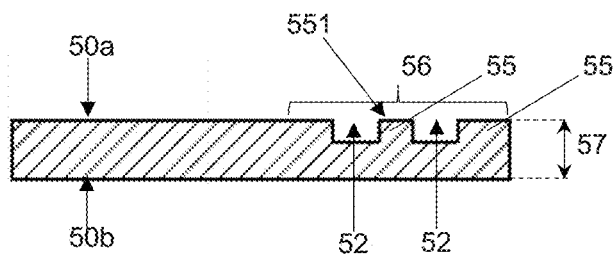

FIGS. 11 and 12 show the contact zone 56 comprising at least one first projecting formation 55 and at least one first hollow formation 52, a top 551 of which is intended to participate in a cage-bearing ring interface.

Figure 15:
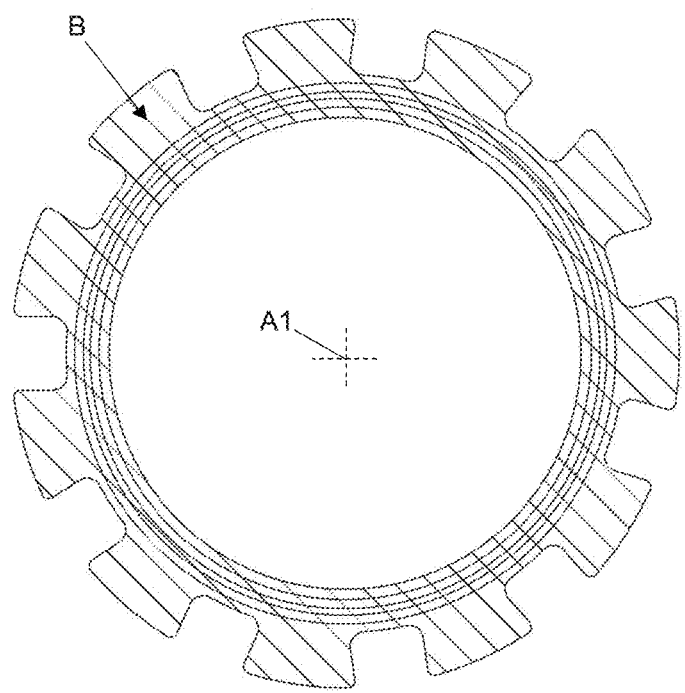
FIG. 15 is a view of the surface B of the cage of the variation of FIG. 11.
Figure 16:
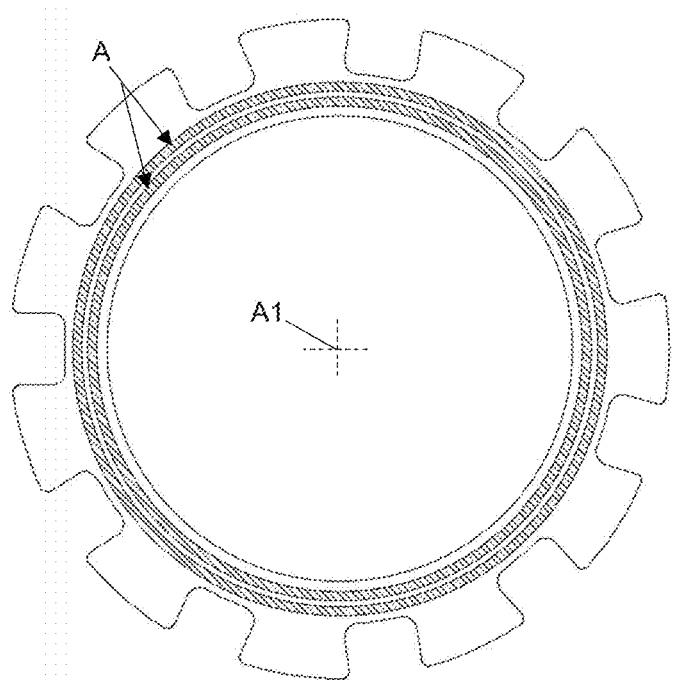
FIG. 16 is a view of the surface A of the cage of the variation of FIG. 11.

In the variation shown in FIG. 11, the bottoms of the hollow formations 52 are generally at the same level as the remainder of the surface 50a. In the case of this variation, the surface B is shaded in FIG. 15 and the surface A is shaded in FIG. 16.

Figure 17:
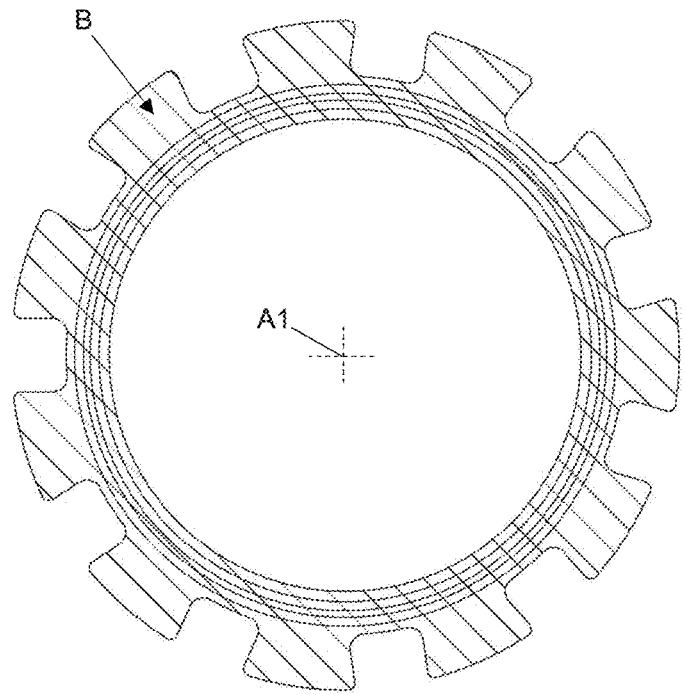
FIG. 17 is a view of the surface B of the cage of the variation of FIG. 12.
Figure 18:
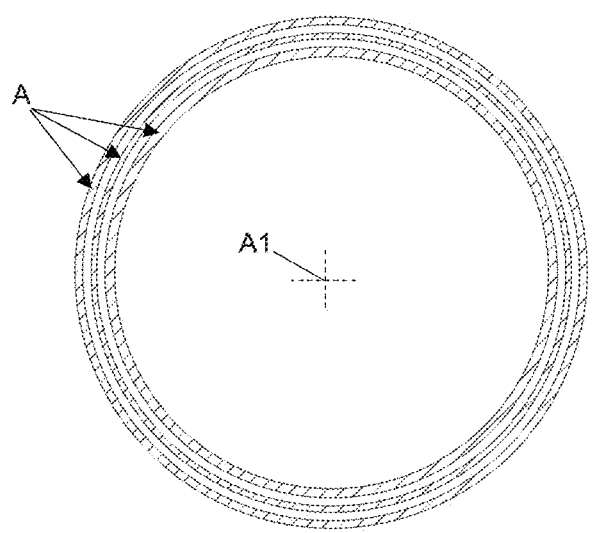
FIG. 18 is a view of the surface A of the cage of the variation of FIG. 12.

In the variation shown in FIG. 12, the tops 551 of the projecting formations 55 are generally at the same level as the remainder of the surface 50a. In the case of this variation, the surface B is shaded in FIG. 17 and the surface A is shaded in FIG. 18.

As another alternative, the bottoms of the hollow formations 52 can be generally recessed relative to the remainder of the surface 50a and the tops 551 of the projecting formations 55 generally can be projecting relative to the remainder of the surface 50a.

Even though they are not shown in FIGS. 11 and 12, the surfaces 50a and 50b can be structured or shaped in the same way. The surfaces 50a and 50b can be identical or symmetrical to each other.

Figure 5:
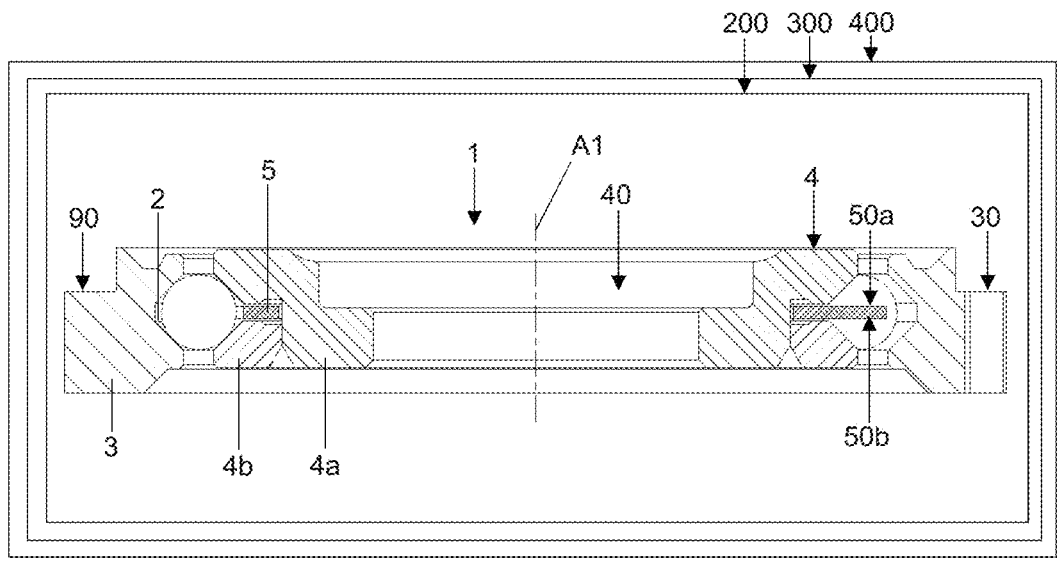
FIGS. 5 and 6 are views showing a fourth variation of the first embodiment of the timepiece.
Figure 6:
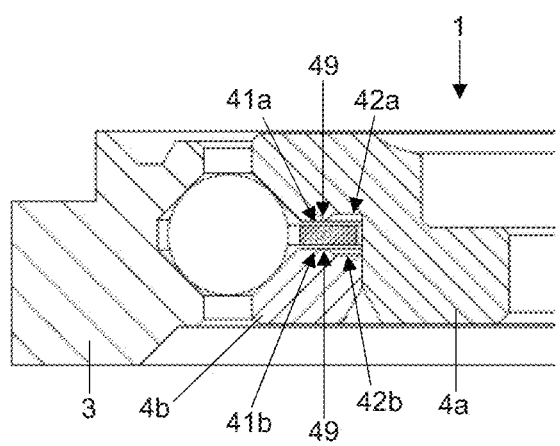

In a fourth variation of the first embodiment shown in FIGS. 5 and 6, the bearing differs from the bearing of the first variation of the first embodiment in that at least one ring comprises a second contact zone 49 having at least one second hollow formation 42a, 42b and/or at least one second projecting formation 41a, 41b.

The at least one second hollow formation allows any contact between the first and second contact zones to be limited.

The top of the projecting formation is intended to participate in a cage-bearing ring interface. In this fourth variation, the cage is a crown only having first openings for receiving the rolling bodies.

The at least one second projecting formation is a rib or comprises one or more ribs. This rib can be of circular or substantially circular shape. Preferably, the at least one second projecting formation comprises two ribs. A first rib 41a is provided to come into contact against a first surface 50a of the cage and a second rib 41b is provided to come into contact against a second surface 50b of the cage. Advantageously, the first rib 41a is provided on an annular element 4a and the second rib 41b is provided on an annular element 4b. The at least one second hollow formation can comprise one or more undercuts 42a, 42b that can be produced on one side or on each side of the rib.

The undercuts 42a, 42b may or may not have the same geometries. These undercuts 42a, 42b may or may not be formed over 360°. A plurality of undercuts can be combined so as to create drops on the surface of the annular elements 4a, 4b.

Alternatively, the at least one second projecting formation comprises a set of bosses, particularly at least three bosses, in particular at least three bosses disposed circularly or substantially circularly relative to the axis A1 and/or at least three bosses disposed at a regular or substantially regular angular interval relative to the axis A1. Preferably, a first set of bosses is provided to come into contact against the first surface 50a of the cage and a second set of bosses is provided to come into contact against the second surface 50b of the cage. Advantageously, the first set is provided on an annular element 4a and the second set is provided on an annular element 4b.

Figure 7:
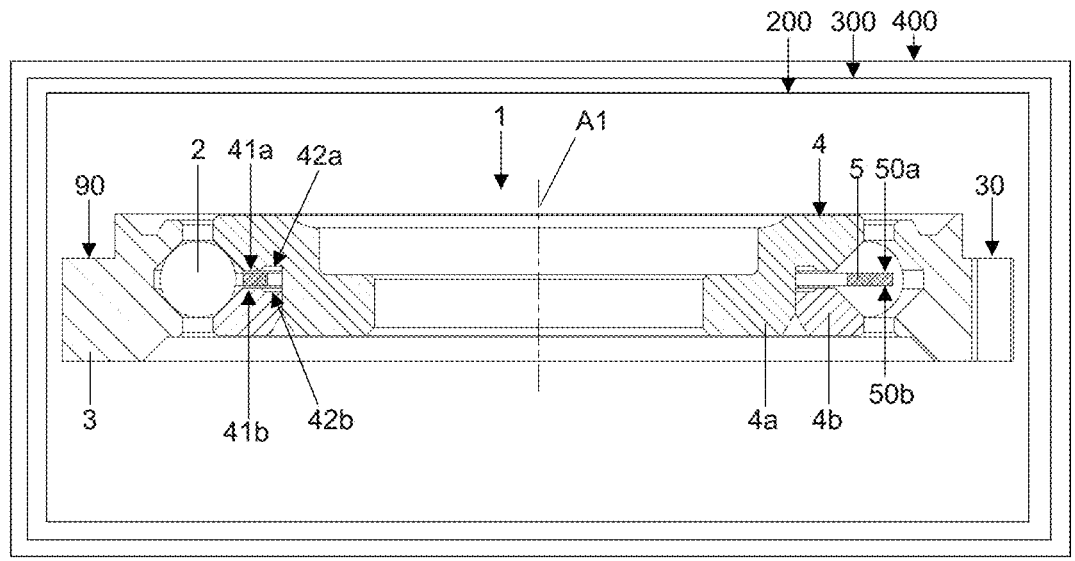
FIG. 7 is a view showing a fifth variation of the first embodiment of the timepiece.

Unless logically or technically incompatible, any combination of several of the various previously described variations can be contemplated. By way of an example, FIG. 7 shows a fifth variation forming a combination of the first variation and of the fourth variation. In the embodiment of FIG. 7, the bearing actually comprises a cage according to the first variation and a ring according to the fourth variation.

Therefore, the first embodiment relates to a lubricated bearing, the cage and/or at least one ring of which is/are shaped so as to minimize at least one contact surface or at least one potential contact surface between the cage and the inner or outer ring. Such an embodiment thus allows at least one contact surface to be reduced or even removed, on which contact surface a lubricant is capable of being accommodated, and thus allows the frictional moment induced by the lubricant to be minimized.

This allows the bearings to be lubricated so as to obtain good performance in terms of the operating noise of the bearings, without the lubricant impairing the energy transmission performance of the bearing, particularly due to possible sticking of the components forming part of the bearing, particularly the cage and the inner or outer ring of the bearing.

Figure 8:
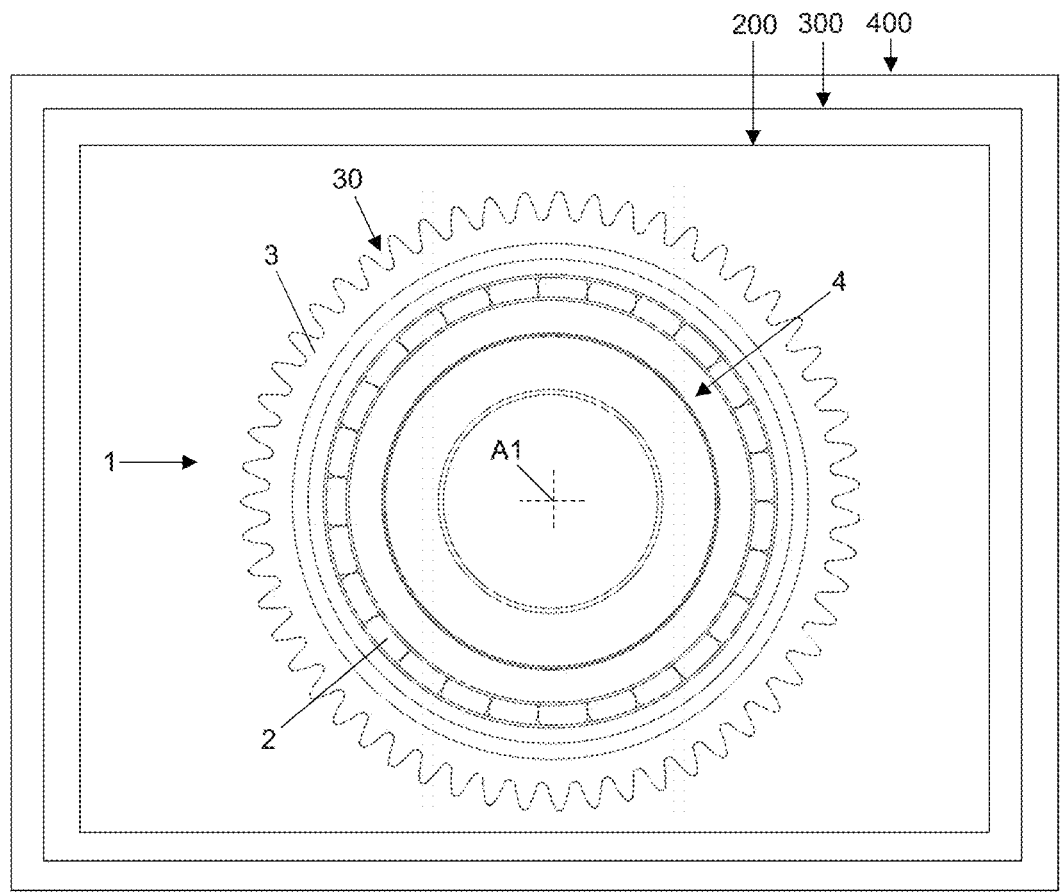
FIGS. 8 and 9 are views showing a second embodiment of a timepiece.
Figure 9:
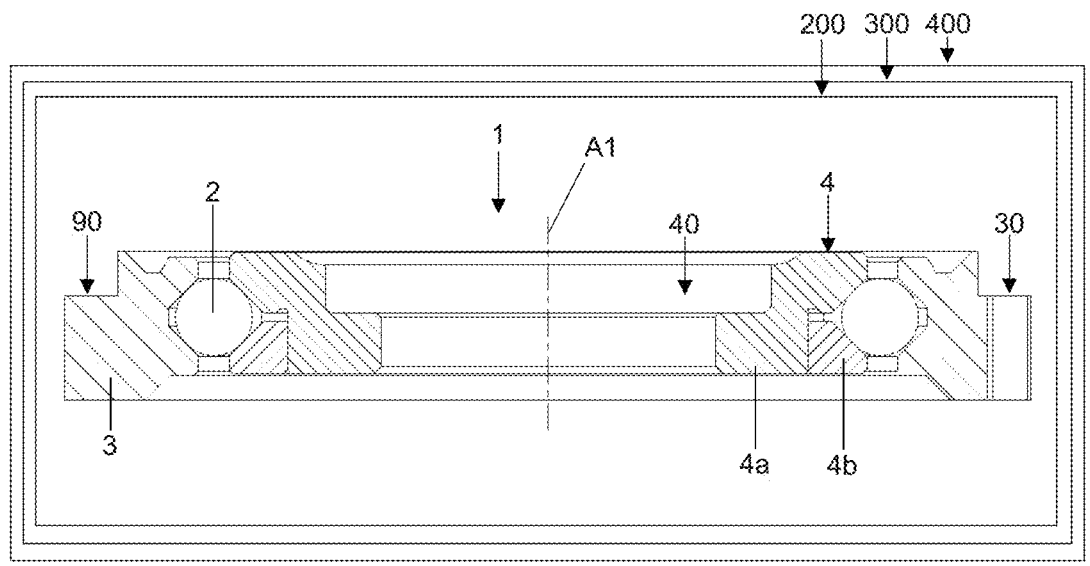

A second embodiment of a timepiece 400 is described hereafter with reference to FIGS. 8 and 9. The timepiece is a watch, for example, in particular a wrist watch, particularly an automatic wrist watch.

The timepiece comprises a timepiece movement 300, in particular a mechanical movement, particularly an automatic movement.

The movement comprises a timepiece mechanism 200. This mechanism can be, for example, an oscillating weight device of an automatic winding device or can be an automatic winding device. The mechanism comprises a bearing.

The bearing 1 is, for example, a timepiece bearing, particularly a timepiece ball bearing. The bearing comprises a first ring 4, particularly an inner ring, a second ring 3, particularly an outer ring, rolling bodies 2, particularly balls.

The bearing has an axis A1, about which the first or the second ring is rotationally guided by means of the rolling bodies. The first and second rings each have a bearing track provided for bearing the rolling bodies.

The bearing does not have a cage. Therefore, it is of the "cageless" type. In other words, the bearing is of the "full complement ball bearing" or "integral ball bearing" type. More generally, the bearing has "integral elements or rolling bodies". More specifically, the rolling bodies of the bearing are capable of coming into contact with each other, particularly when one ring is moved relative to the other about the axis A1. The advantage of such a bearing is that it prevents the risks of sticking between a cage and the inner or outer ring of the bearing, with the bearing being devoid of a cage. Moreover, the advantage of such a bearing is that it is able to withstand significant loads, greater than those that can be supported by a bearing according to the first embodiment. Such an embodiment thus is particularly well adapted to an automatic winding mechanism, the oscillating weight 92 of which exhibits static torque that is greater than or equal to 120 μNm, even greater than or equal to 180 μNm, even greater than or equal to 220 μNm, even greater than or equal to 250 μNm. Alternatively or additionally, such an embodiment is also well adapted to an automatic winding mechanism, the oscillating weight of which comprises a heavy sector, the weight of the oscillating weight being greater than 2 g, even greater than 3 g, even greater than 4 g.

One of the rings 4 can be provided in order to be fixed to a frame of the timepiece movement. It thus can have a formation 40 allowing it to be assembled to the frame. Preferably, the other ring 3 has at least one means 30 for connecting to a mechanism of the movement. Said means can be a tooth 30, for example. The mechanism of the movement can be an automatic winding mechanism, for example. To this end, the ring 3 can further comprise a surface 90 for receiving an oscillating weight, not shown.

One of the first and second rings, for example, the inner ring, can be formed by two annular elements or washers 4a, 4b fixed together or simply elastically drawn toward each other, for example.

An embodiment of a method for producing a timepiece bearing or a timepiece mechanism or a timepiece movement or a timepiece as previously described is described hereafter.

The method comprises the following steps:
providing a bearing comprising a first ring 4, particularly an inner ring, a second ring 3, particularly an outer ring and rolling bodies 2 or supplying a bearing as previously described;
applying a lubricant on at least one surface of the first ring and/or of the second ring and/or of a rolling body.

Preferably, the at least one surface comprises or forms a surface of a bearing track or of part of a bearing track of one of the rings and/or the at least one surface comprises a bearing surface of at least one of the rolling bodies.

Advantageously, the lubricant is applied by jetting or by contactless spraying.

Preferably, the kinematic viscosity of the lubricant at a temperature of 20° C. is between 8 and 15 St, particularly equal to 10 St or substantially equal to 10 St. Alternatively, the lubricant can have lower kinematic viscosity at a temperature of 20° C. For example, the kinematic viscosity of the lubricant at a temperature of 20° C. can be between 0.8 and 1.5 St, particularly equal to 1.2 St or substantially equal to 1.2 St.

Irrespective of the embodiment or the variation, the rolling bodies can be made of steel, a superelastic alloy such as Nitinol, or even made of ceramic, particularly made of ceramic of the zirconium oxide type or even made of ceramic of the silicon nitride type. Body elements made of different materials also can be combined within the same bearing. The use of ceramic allows the risks of micro-solders and/or of corrosion caused over time by steel-on-steel contact to be prevented. The rolling bodies made of silicon nitride particularly provide high resistance, high abrasion resistance, excellent stiffness and very good corrosion resistance. The density of this ceramic is also 40% less than that of steel.

Irrespective of the embodiment or the variation, the cage can, for its part, be made of a copper-based alloy, such as CuBe2, or even of steel. Alternatively, the cage can be made of any other material.

Irrespective of the embodiment or the variation, the bearing can comprise between 5 and 11 balls, particularly 7 balls, with even more for a cageless bearing.

Irrespective of the embodiment or the variation, at least one surface of the first ring and/or of the second ring and/or of a rolling body is coated with a lubricant. The lubricant is, for example, a lubricant with kinematic viscosity at a temperature of 20° C. that is between 8 and 15 St, in particular equal to 10 St or approximately equal to 10 St. The lubricant can be an oil.

Irrespective of the embodiment or the variation, the bearing preferably is a bearing with four contact points.

The rolling bodies preferably are balls. Alternatively, irrespective of the embodiment or the variation, the rolling bodies can be needles or rollers, particularly cylindrical or tapered rollers.

In the second embodiment, the bearing preferably can comprise between 25 and 35 rolling bodies or balls, particularly 27 or 28 or 29 or 30 rolling bodies or balls.

Irrespective of the embodiment of the bearing, the lubricant preferably is applied by "jetting" or contactless spraying. Such a lubrication method allows a controlled volume of lubricant to be applied that is specified and adapted to minimize the friction noise of the bearing, even to negate the operating noise of the bearing. Preferably, the lubricant, in particular an oil droplet, is applied directly on a rolling body. All the rolling bodies can be lubricated. Alternatively, only one or some rolling bodies can be lubricated. In this latter case, surfaces of the other rolling bodies will be lubricated during the operation of the bearing through contact of the lubricated rolling body with a bearing track, then through no contact of the other rolling bodies with the bearing track.

The term "lubricant" used herein refers to any material capable of reducing the friction between the rolling bodies and the rings, whether it involves a solid, pasty or liquid lubricant. Preferably, oil is selected. Completed tests actually show that an oil with viscosity of approximately 10 St perfectly meets the performance objectives of a ball bearing, particularly in terms of noise.

Throughout this document, the term "lubricated bearing" is understood to mean a bearing for which a surface of the inner ring and/or of the outer ring and/or of the cage and/or of all or part of the rolling bodies is lubricated.

Throughout this document, the term "potential contact surface" between two components is understood to mean a contact surface of these two components when said components are in contact following a compensation of clearance.

Throughout this document, the term "through-opening" relates to an opening or a hole that passes through the entire thickness of a part, particularly the cage.

Throughout this document, the term "emerging" relates to an opening or a hole that is positioned at the edge of a part, particularly the cage, with the hole itself forming part of the edge of the part.

The bearing allows rotational guidance to be provided for a first component relative to a second component about the axis A1. Depending on its type, the bearing also allows the second component to absorb axial forces exerted on the first component.

Advantageously, an interesting embodiment of a timepiece ball bearing 1 comprises an inner ring 4, an outer ring 3, and balls 2. At least one surface of the inner ring and/or of the outer ring and/or of a ball is coated with a lubricant. The ball bearing comprises between 25 and 35 balls, particularly 27 or 28 or 29 or 30 balls. The ball bearing does not comprise a cage for separating balls or the ball bearing is of the type with integral balls, particularly of the full complement ball bearing type, or the balls are capable of coming into contact with each other. At least one or some balls or all the balls are made of steel. The inner ring is made of steel and the outer ring is made of steel.

Advantageously, the balls are made of a bearing steel, such as a low-alloy steel containing Cr, for example 100Cr6 or 100CrMo7-3.

Advantageously, the inner ring is made of a stainless steel, for example a 4C27A (DIN 1.4197).

Advantageously, the outer ring is made of a stainless steel, for example a 4C27A (DIN 1.4197).

Advantageously, the balls are mounted in the rings with a tangential play or clearance. This play is measured when all the balls are in contact, i.e. when the balls form a single string with two end balls and intermediate balls, each intermediate ball being in contact with two neighbor balls and each end ball being in contact with a single intermediate ball. The play is for example higher than the radius of the balls or equal to the radius of the balls. The play is for example lower than the diameter of the balls or equal to the diameter of the balls.

A first ball bearing according to a particular implementation of this interesting embodiment has 27 balls. It has been tested. It has been mounted in a timepiece on a movement for guiding an oscillating weight in rotation. A sound sensor has been set at 5 cm from the timepiece glass. When the timepiece is initially moved, a sound level of 25 dBA is recorded by the sound sensor. After a determined cycle of rotation of the oscillating weight (this cycle bringing about a wear equivalent to a wear obtained after a usual use of the timepiece during 10 years), the timepiece is moved again and a sound level of 25 dBA is recorded again. A second ball bearing has been tested. It only differs from the first ball bearing in that the balls are made of silicon nitride. It has been mounted in a same timepiece on a same movement for guiding a same oscillating weight in rotation. A same sound sensor has been set at 5 cm from the timepiece glass. When the timepiece is initially moved, a sound level of 25 dBA is recorded by the sound sensor. After a determined cycle of rotation of the oscillating weight (this cycle bringing about a wear equivalent to a wear obtained after a usual use of the timepiece during 10 years), the timepiece is moved again and a sound level of 33 dBA is recorded. Thus, it appears that, regarding a sound criteria, the use of steel balls in a lubricated ball bearing is advantageous over the use of ceramic balls.

Advantageously, an interesting embodiment of an oscillating weight device or an automatic winding device comprises:
  a frame 91, and
  an oscillating weight 92,
    the static torque of which is greater than or equal to 120 μNm or 180 μNm or 220 μNm or 250 μNm, and/or the oscillating weight weighing more than 2 g or 3 g or 4 g, and
  a ball bearing 1 according to the interesting embodiment of timepiece ball bearing 1 disclosed above, the ball bearing guiding the oscillating weight on the frame around the axis A1, or
  a ball bearing 1 comprising an inner ring 4, an outer ring 3, and balls 2, at least one surface of the inner ring and/or of the outer ring and/or of a ball being coated with a lubricant,
    the ball bearing guiding the oscillating weight on the frame around the axis A1,
    the ball bearing comprising between 25 and 35 balls, particularly 27 or 28 or 29 or 30 balls,
    the bearing not comprising a cage for separating balls or the bearing being of the type with integral balls, particularly of the full complement ball bearing type, or the balls being capable of coming into contact with each other,
    at least one or some balls or all the balls being made of steel or silicon nitride or a superelastic alloy such as Nitinol,
    the inner ring being made of steel or a superelastic alloy such as Nitinol, and
    the outer ring being made of steel or a superelastic alloy such as Nitinol.

Advantageously, an embodiment of a timepiece movement comprises the interesting embodiment of the device as described in the paragraph above.

Advantageously, an embodiment of a timepiece comprises the embodiment of a timepiece movement as described in the paragraph above or the interesting embodiment of the device as described above.

The invention claimed is:

1. A cage for separating rolling bodies for a bearing, the cage comprising:
  first openings for receiving the rolling bodies, and
  at least one first contact zone intended to come into contact with a bearing ring and having at least one hollow formation, and
  wherein the cage is arranged so that an area of a surface of the cage capable of coming into contact with the bearing ring is less than 0.6 times the area of:
  an orthogonal projection of the cage along an axis of the cage, when the cage is a flat annular cage; or
  a cylindrical surface of a cylinder having a diameter equal to a diameter of the cylinder defining a surface of the cage and included between two end edges of the cage, when the cage is a cylindrical cage.

2. The cage as claimed in claim 1, wherein the cage has a flat annular shape or wherein the cage has a cylindrical shape.

3. The cage as claimed in claim 1, wherein the cage comprises a first edge and a second edge, the first openings being openings emerging on the first edge or on the second edge and/or the at least one first hollow formation comprises at least one second opening passing through a thickness of the cage.

4. The cage as claimed in claim 3, wherein the cage has a flat annular shape, the first edge being an outer edge and the second edge being an inner edge, or wherein the cage has a cylindrical shape, the first edge being an edge of a first end and the second edge being an edge of a second end.

5. The cage as claimed in claim 1, wherein the cage comprises a plurality of hollow formations, each disposed between two first adjacent openings.

6. The cage as claimed in claim 1, wherein the contact zone comprises at least one first projecting formation, a top of the at least one first projecting formation being intended to participate in a cage-bearing ring interface.

7. The cage as claimed in claim 6, wherein the at least one first projecting formation comprises a rib of circular or substantially circular shape and/or wherein the at least one first projecting formation comprises a set of bosses.

8. A bearing, comprising:
  a first ring,
  a second ring,
  rolling bodies,
  a cage for separating the rolling bodies,
    wherein the cage and the first and second rings are arranged so that an area of a surface (A) of the cage capable of coming into contact with the rings is less than 0.6 times the area of:
    a orthogonal projection of the cage along an axis of the bearing, when the cage is a flat annular cage; or
    a cylindrical surface a cylinder having a diameter equal to a diameter of the cylinder defining a surface of the cage and included between two end edges of the cage, when the cage is a cylindrical cage.

9. The bearing as claimed in claim 8, wherein a surface of one of the first and second rings comprises at least one contact zone having at least one hollow formation and/or at least one projecting formation, a top of which participates in a cage-ring interface.

10. The bearing as claimed in claim 9, wherein the at least one projecting formation comprises a circular or substantially circular shaped rib and/or wherein the at least one projecting formation comprises a set of bosses.

11. The bearing as claimed in claim 8, comprising
at least one surface of the first ring and/or of the second ring and/or of the rolling bodies coated with a lubricant, and/or
wherein the first ring comprises a first annular element and a second annular element, the first and second annular elements being shaped so as to provide, when they are assembled, a groove for accommodating the cage, and/or
wherein the rolling bodies are balls or needles or rollers, and/or
wherein the rolling bodies are made of ceramic.

12. A timepiece mechanism, comprising the cage as claimed in claim 1.

13. A timepiece movement comprising the mechanism as claimed in claim 12.

14. A timepiece, comprising a movement as claimed in claim 13.

15. A method for producing a timepiece bearing or a timepiece mechanism or a timepiece movement or a timepiece, the method comprising:
providing the bearing as claimed in claim 8;
applying, on at least one surface of the first ring and/or of the second ring and/or of the rolling bodies, a lubricant.

16. The method as claimed in claim 15, wherein the lubricant is applied by jetting or by contactless spraying.

17. The cage as claimed in claim 7, wherein the set of bosses comprises at least three bosses disposed circularly or substantially circularly and/or the set of bosses comprises at least three bosses disposed at a regular or substantially regular angular interval relative to an axis of the cage.

18. The bearing as claimed in claim 11, wherein the lubricant has a kinematic viscosity at a temperature of 20° C. that is between 8 and 15 St.

19. The method as claimed in claim 15, wherein the lubricant has a kinematic viscosity at a temperature of 20° C. that is between 8 and 15 St.

20. The cage as claimed in claim 1, wherein the cage is arranged so that said area of the surface of the cage capable of coming into contact with the bearing ring is less than 0.5 times said area of:
the orthogonal projection of the cage along the axis of the cage, when the cage is a flat annular cage; or
the cylindrical surface of a cylinder having a diameter equal to the diameter of the cylinder defining the surface of the cage and included between two end edges of the cage, when the cage is a cylindrical cage.

21. The cage as claimed in claim 1, wherein the cage is arranged so that said area of the surface of the cage capable of coming into contact with the bearing ring is less than 0.4 times said area of:
the orthogonal projection of the cage along the axis of the cage, when the cage is a flat annular cage; or
the cylindrical surface of a cylinder having a diameter equal to the diameter of the cylinder defining the surface of the cage and included between two end edges of the cage, when the cage is a cylindrical cage.

22. The cage as claimed in claim 1, wherein the cage is arranged so that said area of the surface of the cage capable of coming into contact with the bearing ring is less than 0.3 times said area of:
the orthogonal projection of the cage along the axis of the cage, when the cage is a flat annular cage; or
the cylindrical surface of a cylinder having a diameter equal to the diameter of the cylinder defining the surface of the cage and included between two end edges of the cage, when the cage is a cylindrical cage.

* * * * *